(12) United States Patent
Bower et al.

(10) Patent No.: US 7,458,624 B1
(45) Date of Patent: Dec. 2, 2008

(54) TAILGATE AND RAMP FOR PICKUP TRUCK

(75) Inventors: Steven N. Bower, Elizabeth, PA (US); Paul R. Haskins, Belle Vernon, PA (US)

(73) Assignee: Trailgate Tailgate Systems, Inc., Belle Vernon, PA (US)

( * ) Notice: Subject to any disclaimer, the term of this patent is extended or adjusted under 35 U.S.C. 154(b) by 0 days.

(21) Appl. No.: 11/803,982

(22) Filed: May 16, 2007

(51) Int. Cl.
*B62D 25/00* (2006.01)
(52) U.S. Cl. ....................................................... 296/61
(58) Field of Classification Search ...................... 296/61
See application file for complete search history.

(56) References Cited

U.S. PATENT DOCUMENTS

| | | | | |
|---|---|---|---|---|
| 4,155,468 A | * | 5/1979 | Royce, deceased | 414/556 |
| 4,571,144 A | | 2/1986 | Guidry | 414/537 |
| 4,596,417 A | | 6/1986 | Bennett | 296/61 |
| 5,273,335 A | | 12/1993 | Belnap | 296/61 |
| 5,342,105 A | * | 8/1994 | Miles | 296/61 |
| 5,597,195 A | * | 1/1997 | Meek | 296/61 |
| 5,752,800 A | | 5/1998 | Brincks | 414/537 |
| 5,791,717 A | | 8/1998 | Reich | 296/61 |
| 5,806,907 A | | 9/1998 | Martinus | 296/26.11 |
| 5,816,638 A | * | 10/1998 | Pool, III | 296/61 |
| 5,907,276 A | | 5/1999 | Lance | 340/425.5 |
| 5,988,725 A | | 11/1999 | Cole | 296/61 |
| 6,293,748 B1 | * | 9/2001 | Savaria | 414/537 |
| 6,340,190 B1 | | 1/2002 | Rosebrugh | 296/26.11 |
| 6,447,040 B1 | | 9/2002 | Young, Sr. | 296/61 |
| 6,692,055 B2 | * | 2/2004 | Schilling | 296/61 |
| 6,719,345 B2 | * | 4/2004 | Ootsuka et al. | 296/26.08 |
| 6,722,721 B2 | * | 4/2004 | Sherrer et al. | 296/61 |
| 6,739,639 B1 | | 5/2004 | Chumley | 296/26.08 |
| 6,746,068 B1 | | 6/2004 | Hurd | 296/50 |
| 6,764,123 B1 | | 7/2004 | Bilyard | 296/61 |
| 6,834,903 B2 | | 12/2004 | Harper | 296/51 |
| 6,913,305 B1 | | 7/2005 | Kern | 296/51 |
| 6,991,277 B1 | | 1/2006 | Esler | 296/50 |
| 7,159,918 B2 | * | 1/2007 | Lussier | 296/26.09 |
| D544,826 S | * | 6/2007 | Smith | D12/414 |
| 7,303,222 B2 | * | 12/2007 | Wilkins | 296/37.6 |
| 7,347,473 B2 | * | 3/2008 | Miller et al. | 296/57.1 |
| 2007/0262602 A1 | * | 11/2007 | Nagle | 296/51 |

* cited by examiner

*Primary Examiner*—Kiran B. Patel
(74) *Attorney, Agent, or Firm*—Jeffrey S. Sokol; Cook & Franke S.C.

(57) ABSTRACT

This invention is a tailgate for a pickup truck having a unibody frame that is pivotally secured at its lower end proximal the rear end of the truck bed. The frame includes a pair of linear risers that fit into the rear vertical recesses of the sidewalls of the truck when the tailgate is in a closed position. The risers support a plurality of bowed lateral beams that extend outwardly from the rear of the truck to extend the length of its cargo bay when the tailgate is in its closed. The bowed beams support a set of flat angled ramps that are aligned with the truck bed. The tailgate is swung to an open position so that the ramps extend down from the truck bed and are joined by a detachable ramp to form one or more low incline ramps for loading and unloading items into the cargo bay.

12 Claims, 7 Drawing Sheets

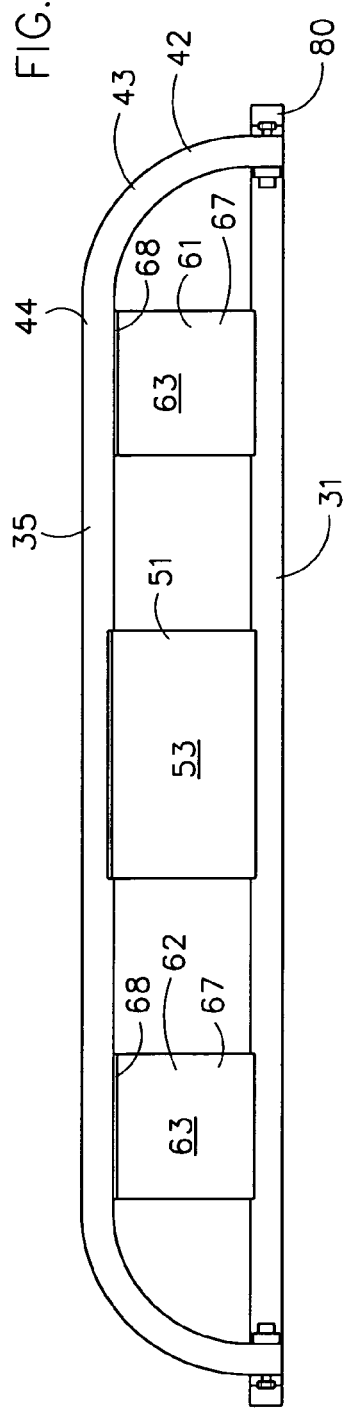
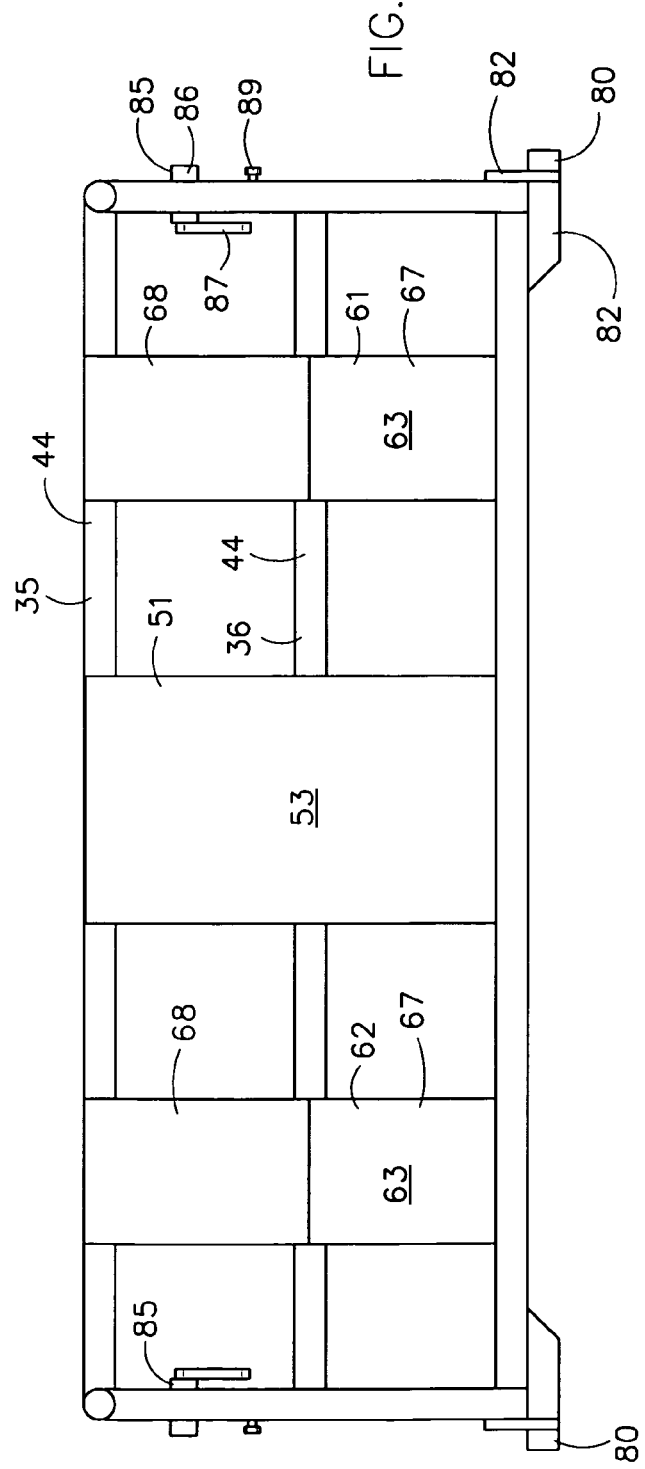

TAILGATE AND RAMP FOR PICKUP TRUCK

TECHNICAL FIELD OF THE INVENTION

This invention relates to a tailgate for a pickup truck with a bowed construction to extend the cargo bay when closed and form a less steep incline ramp when opened.

BACKGROUND OF THE INVENTION

The cargo bay of a pickup truck is generally formed by its truck bed, sidewalls and tailgate. The truck bed generally supports the weight of the items, and the sidewalls and tailgate protect these items and keep them from falling out of the bay during transport. While the sidewalls are rigidly fixed, the tailgate moves between open and closed positions to gain access to the cargo bay and its truck bed. Tailgates are typically latched or locked shut during transport, and unlatched and swung open to load and unload items in the cargo bay. When closed, the tailgate defines the length of the truck bed and its cargo bay. Many mid size or short bed pickups have a bed length of about 76 inches. Full size pickups typically have a bed length of about 97 inches, but this length is reduced by about 20 inches when a tool box is secured toward the front of the cargo bay.

A source of frustration with pickup trucks is that some items are just a little too long to fit in the cargo bay and close the tailgate. For example, many motorcycles, dirt bikes and four wheel recreational vehicles have a length of about 80 inches. Although the tailgate can be left open to accommodate these longer items, this is not generally desired for several reasons. First, the tailgate can bounce around during transport and be damaged. Second, resting the vehicle on the tailgate can overload and break the tailgate, particularly when traveling on a bumpy road. Third, leaving the tailgate down inhibits the proper use of the rear bumper and poses a safety risk. Fourth, although items are often secured in the cargo bay by a rope, cord, chain or some other means, leaving the tailgate down increases the possibility of items falling out the rear end of the truck during transport. This is of particular concern when transporting a wheeled vehicle.

Another problem with conventional pick up trucks is getting heavy items in and out of the cargo bay. The truck bed is typically elevated more than a couple feet above the ground. Heavy objects have to be lifted onto the truck bed, or lowered down from the truck bed. This can be difficult or impossible for a single person when a heavy item is involved. Items can be dropped and damaged, and the person can be seriously injured. The weight of a heavy item can also overload and damage the tailgate. While the pickup trucks and their truck beds are generally designed to handle loads in excess of two or more tons, conventional tailgates are typically designed to support about 1,000 pounds. Heavy items are best placed directly on the truck bed. Heavy items can buckle the sheet metal or otherwise damage the tailgate. Heavy items should not generally be placed on or toward the outer end of the tailgate as this creates the most stress on the tailgate.

Although ramps are frequently used to help load and unload items in the cargo bay, conventional tailgates do not readily accommodate these ramps. Ramps are typically placed with one end resting on the ground and the other end resting on the outer end of the tailgate. As an object such as a motorcycle, dirt bike or four wheel recreational vehicle moves up the ramp, more and more of its weight is supported by the end of the tailgate. When the motorcycle reaches the top of the ramp, most of its weight is supported by the end of the tailgate. The load on the tailgate is increased when a person sits on the vehicle to steer it as it moves along the ramp. Noticeable shifting, bending or breakage of the ramp or tailgate can cause the vehicle to fall off the ramp or tailgate, which can damage the vehicle or injure people on or near the vehicle.

A problem with detachable ramps is providing both ease of use and safety. Given the fixed height of the bed of the pickup truck is typically 24 to 36 inches, the incline or slope of the ramp is basically a function of its length. Yet, longer ramps are typically heavier to lift and more likely to bow or bend when a vehicle moves across them. In certain situations, bowing can lead to a dangerous bouncing effect and slipping. Although longer, single-piece detachable ramps are desirable because they do not require assembly, they can also be more unwieldy. For example, wooden boards are popular for ramps because they are inexpensive to purchase and may be readily obtained as scrap material from a construction project. Although thicker boards typically provide better stiffness and safety during use, they are also typically heavier, more expensive and may not be available as scrap material.

Yet, short ramps can compromise safety. The shorter the ramp, the steeper the incline. The length of the ramp is typically limited by the length of the truck bed so that the ramp can be transported for use to various locations. As a result, detachable ramps typically have a relatively steep incline angle of 30°. Yet, an excessively steep ramp incline is not particularly desirable as it can be dangerous for a person riding a recreational vehicle such as a dirt bike up or down a pickup truck ramp. When driving down a steep ramp, the bike striking the ground at a steep angle and can throw the rider or cause him or her to lose control of the bike. When driving up a steep ramp, the force of the vehicle when it first engages the ramp can push or cause the ramp to slide in the direction of travel, or cause the ramp to slide laterally or the front wheel to turn so that the vehicle drives off the ramp. Such occurrences are dangerous as they can cause the vehicle or rider to fall awkwardly against the ramp, truck or ground, and result in damage to the truck or recreational vehicle or even injure the rider or other nearby person.

Designs for extending the cargo bay of a pickup truck are well known. Some even form a ramp for loading and unloading recreational vehicles in the cargo bay. Unfortunately, these designs suffer from a variety of drawbacks. A first type of extension and ramp design is shown in U.S. Pat. No. 4,596,417 to Bennett, the disclosure of which is incorporated by reference. The device is mounted around the perimeter of a tailgate when the tailgate is in its lowered position. The extension device is removed and reattached to the outer end of the tailgate as a ramp. This type of extension is time consuming to use because it must be continuously attached, removed and reattached. Parts can also jam, fasteners can strip, and the proper tools have to be readily available. The device can also lead to overloading and damage to the tailgate for the above noted reasons.

A second type of extension and ramp design replaces the original tailgate of the pickup truck. An example of this type of design is shown in U.S. Pat. No. 6,834,903 to Harper, the disclosure of which is incorporated by reference. This device includes dual telescoping ramp assemblies that attach to the rear of the sidewalls of the pickup. When fully retracted and in its upright, closed and latched position, the device is similar to a conventional tailgate in that it does not extend the cargo bay. The device extends the cargo bay by swinging a first portion down into a horizontal position planar to the truck bed. The subsequent telescoping sections are rotated to a vertical position to form a partial barrier for retaining wheeled vehicles in the cargo bay. The ramps are formed by fully extending the telescoping ramp portions and rotating them to extend toward the ground.

There are several problems with this telescoping design. The design only forms a partial barrier for retaining wheeled vehicles in the cargo bay. Large openings remain between the sidewalls of the truck and the vertical ramp portions that form the partial barrier. Only the support lines supporting the tailgate extension obstruct these large openings. Items are free to engage and possibly cut or damage the tension lines, or fall out of the cargo through the large openings. Another problem is that the many telescoping sections can be bent and jam given the rugged environment of a pickup truck cargo bay and the fact that the device is exposed to the weather. A further problem is the heavy weight and significant cost of providing dual telescoping ramps to form a tailgate. Five telescoping sections are needed to produce a ramp incline angle close to 20°. Finally, the unsightly appearance of this design, particularly regarding the telescoping ramps, dissuades or precludes the owner from leaving this contraption in place when not in use. The original tailgate has to be reattached to return the pickup truck to its desired appearance.

The present invention is intended to solve these and other problems.

BRIEF DESCRIPTION OF THE INVENTION

The present invention relates to a tailgate for a pickup truck. The tailgate has a unibody frame that is pivotally secured at its lower end proximal the rear end of the truck bed. The frame includes a pair of linear risers that fit into the rear vertical recesses of the sidewalls of the truck when the tailgate is closed. The risers support a plurality of bowed lateral beams that extend outwardly from the rear of the truck to extend the length of its cargo bay when the tailgate is in its closed. The bowed beams support a set of flat angled ramps that are aligned with the truck bed. The tailgate is swung to an open position so that the ramps extend down from the truck bed and are joined by a detachable ramp to form one or more low incline ramps for loading and unloading items into the cargo bay.

One advantage of the present tailgate invention is that it extends the cargo bay of the truck when the tailgate is secured in its closed position. The bowed lateral beams of the tailgate extend the length of the cargo bay about eight inches. This is particularly useful for items such as many motorcycles, dirt bikes and four wheel recreational vehicles that have a length that is slightly longer than the truck bed of many conventional pickup trucks. This tailgate is also useful when a tool chest or other item is secured or placed toward the front end of an otherwise longer cargo bay. The bowed tailgate is secured or locked shut while transporting these types of longer items. The tailgate is not left open to help support the weight of the item or to bounce around during transport. The closed tailgate only extends 3.5 inches beyond the bumper of a typical pickup truck, and thus does not obstruct the rear bumper. The tailgate does provide added safety to help prevent the motorcycle, dirt bike or recreational vehicle from falling off the rear end of the truck.

Another advantage of the present tailgate is that its partially detachable ramp is easy and uncomplicated to use and provides a relatively low incline slope that is safer for loading and unloading items such as wheeled vehicles into and out of a pickup truck cargo bay. The bowed shape of the tailgate forms a fixed portion of the ramp. The fixed ramp portion brings the effective height of the truck bed down about eight inches or 25%, and has a slope of about 15°. As a result, the detachable ramp portion can be shorter to achieve the same degree of incline. The shorter detachable ramp is thus stiffer and more stable during use. This shorter detachable ramp portion is easier to handle, and readily stored in the truck bed. The combined length of the fixed and detachable ramp portions provide a lower incline ramp that improves the stability and safety of the ramp for moving vehicles such as a dirt bike and four wheel vehicle into and out of the pickup truck cargo bay. The lower incline of the detachable ramp helps minimize the forces of the vehicle acting on the ramp that could cause the ramp to slide along the direction of travel, or laterally to the direction of travel. The shorter detachable ramp is also less likely to bounce and shift during use. The detachable ramp can also include a mounting bracket to further improve stability and safety.

A further advantage of the present tailgate is its strong, yet light unibody construction. The tailgate frame and ramp plates are robustly designed and welded or otherwise integrally attached to form a strong platform to support the weight of a conventional motorcycle, dirt bike or all terrain recreational vehicle. The frame is made of tubular steel components to provide a construction that is both strong and lightweight. The detachable ramp portion is also a single continuous piece that is easily installed for safe use. The detachable ramp does not need to be unfolded or telescoped out for use, and does not need to be folded or retracted to store in the truck bed. The detachable ramp can be a shorter and thus sufficiently stiff but less expensive wooden board. The detachable ramp can also be a lighter weight piece of webbed metal or a molded or extruded piece of plastic. The overall frame and ramp construction provides a sturdy and stable platform during the loading and unloading of the heavy items or wheeled vehicles.

A still further advantage of the present combined tailgate and ramp is their simplicity of use. The tailgate and ramp are used in a straightforward manner. The tailgate opens just like a conventional tailgate. The ramp is easily used by simply setting the single piece, light weight, detachable ramp in place. No tools or complicated unfolding or telescoping is required. No heavy ramps need to be lifted. The simple two step, set up and take down process of using the ramp avoids the hassles and frustrations associated with jamming parts, stripped fasteners, or constant assembling and disassembling the ramp.

A still further advantage of the present tailgate is its attractive appearance. When closed, the side rails and bottom beam are received by the existing frame of the pickup truck. The more visibly dominant lateral beams are made of tube steel and have an attractive bowed configuration that is generally pleasing to the eye. The ramps are evenly spaced and relatively attractive in design. As a result, the attractive and symmetrical appearance of the bowed tailgate allows it to be left in place throughout the outdoor season or even all year round. The time and hassle of removing and replacing the original tailgate is minimized or eliminated. Moreover, damage to the original tailgate is avoided.

Other aspects and advantages of the invention will become apparent upon making reference to the specification, claims and drawings.

BRIEF DESCRIPTION OF THE DRAWINGS

FIG. 7 is a top view of the tailgate invention.

FIG. 8 is a front view of the tailgate invention.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
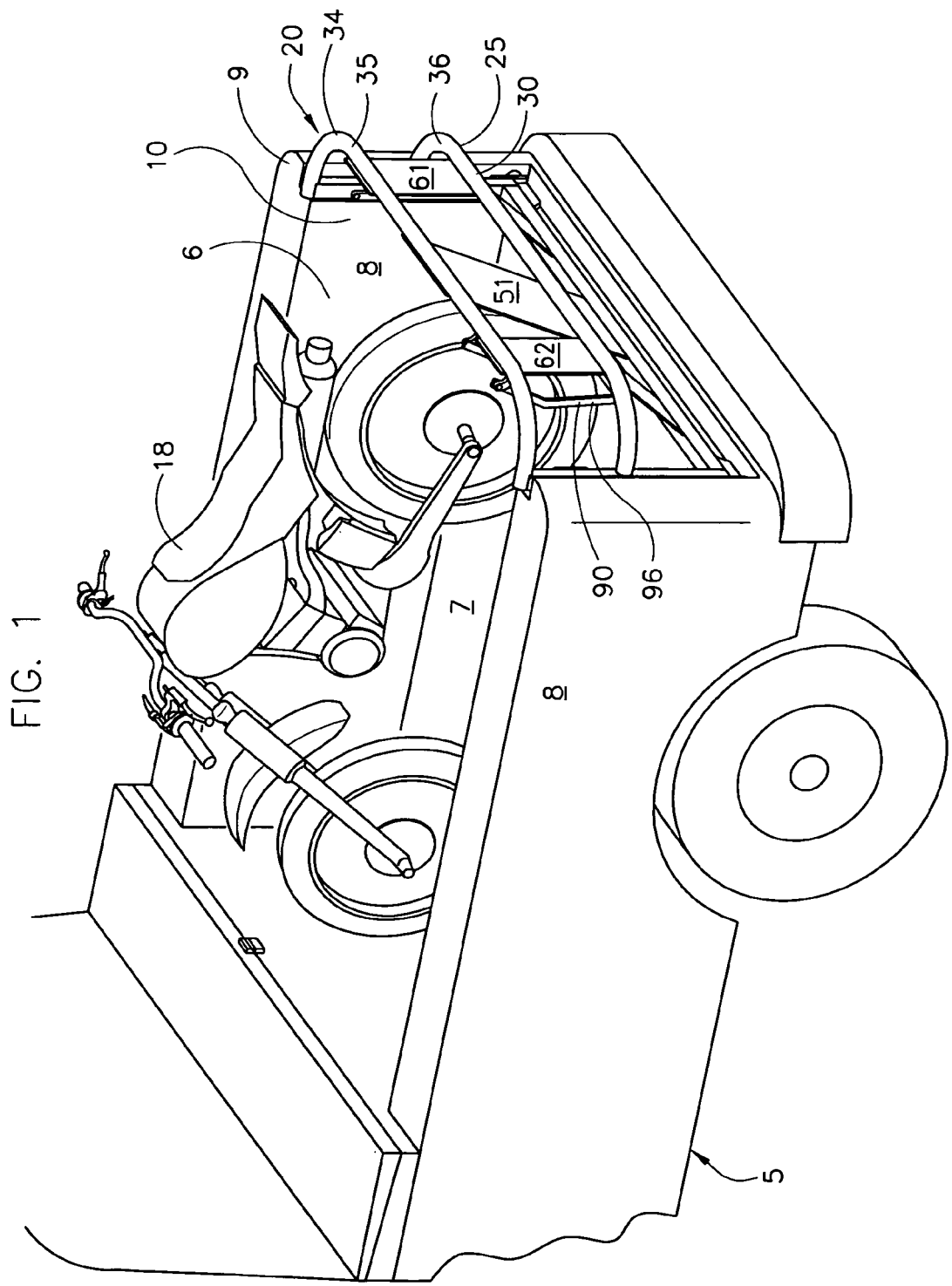
FIG. 1 is a perspective view of the present tailgate inventions installed on the rear end of a pickup truck with a dirt bike in the cargo bay and the tailgate in its closed position.
Figure 2:
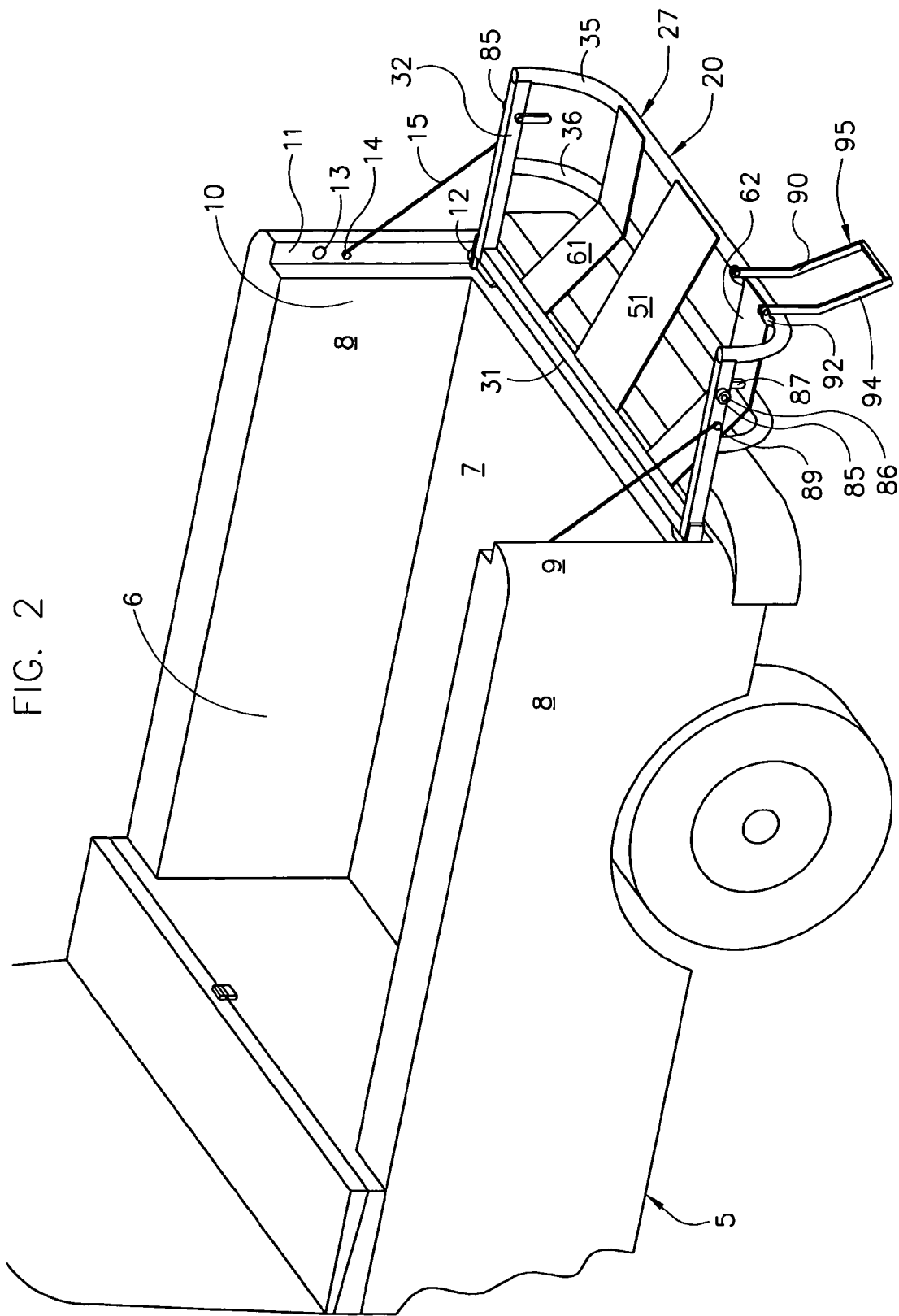
FIG. 2 is a perspective view of the present tailgate inventions swung out into its open position.

Pickup trucks 5 have a cargo bay 6 defined by the rear wall of the cab, the truck bed 7, and the sidewalls 8 of the truck bed as in FIGS. 1 and 2. The rear end 9 of the truck 5 has a generally rectangular tailgate opening 10 for loading items into and out of the cargo bay 6. The width of the opening 10 is defined by the sidewalls 8 of the truck 5, and is generally about 60 inches wide. The height of the opening 10 is defined by the planar surface of the truck bed 7 and the top of the sidewalls 8, and is generally about 20 inches tall. When originally manufactured, a pickup truck typically includes a conventional tailgate (not shown) with a generally planar shape. This original tailgate is shaped to fit into and close the rectangular tailgate opening 10. When the tailgate is closed, the rear end 9 of each sidewall 8 forming the opening 10 has a vertical recess or notch 11 that flushly receives and engages the vertical sides of the tailgate.

Each vertical tailgate recess 11 includes a reinforced pivot joint 12, a latch pins 13, and a nut insert or post 14 for securing one of two cables or securement cords 15. Although some tailgates are pivotally secured on only one side 8 and swing open like a door, the more typical arrangement is to have each side of the tailgate pivotally secured to the sidewalls. The points for securing the tailgate 12 are located in the vertical tailgate recess 11 near the truck bed 7. The pivot joints 12 are adapted to snuggly receive the cups of the conventional tailgate. These joints 12 form an axis of rotation 17 about which the tailgate rotates. This axis 17 is parallel to and slightly below the surface of the truck bed 7, which is generally parallel to the ground 19 supporting the truck 5. When the tailgate is open, its now upwardly facing surface is generally flush with and planarly aligned to the truck bed 7 and surrounding ground 19. The tailgate is held in its open position by a pair of cables or cords 15 that are pulled taught to stop and support the tailgate in that open or horizontal position. When open, the flat inside surface of the tailgate is generally flush with the flat horizontal surface of the truck bed 7. The tailgate is also provided with latch mechanisms for securing each side of the tailgate to its corresponding sidewall when closed.

The present invention pertains to a tailgate for a vehicle such as a pickup truck 7 and is generally designated by reference number 20 in FIGS. 1-8. The tailgate 20 forms a complete tailgate design that is either manufactured in place of or is a replacement for a conventional pickup truck tailgate. The tailgate 20 has upper and lower ends 21 and 22 that define its height or length, and opposed sides 23 and 24 that define its width. The height and width of the tailgate 20 are sized to match the height and width of the tailgate opening 10 of a specific pickup truck 5. The tailgate 20 is robustly designed for rugged use, but weighs only about 55 pounds. The tailgate 20 is selectively rotated about axis 17 between closed 25 and open 27 positions in a manner similar to a conventional tailgate. When closed 25 as in FIG. 1, the bowed tailgate 20 extends the length of the cargo bay 6 about eight inches, which is a distance about equal to or less than that of the rear bumper. When open 27 as in FIG. 2, the tailgate 20 forms several fixed ramp portions to help load and unload items and wheeled vehicles 18 into and out of the cargo bay 6.

The tailgate 20 includes a unibody frame 30 formed by metal components that are welded together to provide a solid, integral construction as best shown in FIGS. 5-8. The frame 30 includes a lower horizontal linear pivot bar 31, a pair of vertical linear side risers 32, and a set of bowed lateral beams 34 that includes an upper beam 35 and at least one intermediate beam 36. Each of these components 31-36 has opposed ends, and is preferably made of tube steel for added strength and reduced weight. The pivot bar 31 and side risers 32 are preferably 1.5 inch square tubing having a wall thickness of ¹⁄₁₆ inch. The pivot bar 31 has a length of about 57 inches. Each riser 32 has a length of about 20 inches. The side of the lower end of each riser 32 butts up against the outer most end of the pivot bar 31, so that the overall length of the lower end 21 of the frame 30 is 60 inches. The upper end of each riser 32 has a ¾ inch radius notch for receiving one end of the upper beam 35. Each riser 32 also has a lateral hole formed through it at a location about 4 to 5 inches from its upper end for receiving a latch mechanism, as discussed below. Although specific dimensions are provided for components forming the tailgate 20, it should be understood that these dimensions can vary to accommodate the tailgate opening 10 and vertical recess 11 of a wide variety of vehicles and trucks 5 without departing from the broad aspects of the invention.

Each bowed beam 35 and 36 is preferably formed from 1.5 inch round tubing with a wall thickness of ¹⁄₁₆ inch. Each bowed beam 35 and 36 is bent into a U-shape. Similar to the lower end 21 of the frame, each beam 35 and 36 has a side-to-side length of 60 inches. Each beam 35 and 36 includes opposed outwardly extending side portions 42, inwardly curved side portions 43 and a main linear central portion 45. Each outward extending portion 42 has a length of about eight inches. This portion 42 forms an eight inch offset between the pivot bar 31 and the central portion 45 of the bowed beams 35 and 36. This offset extends the length of the cargo bay 6 of the truck 5 about eight inches. The eight inch offset extends the cargo bay 6 of many pickup trucks 5 an amount sufficient to provide a significant increase in cargo bay length to accommodate many items such as a conventional dirt bike, motorcycle or four wheel recreational vehicle 18. Still, it should be understood that the length of extension 42 and the amount of the offset can increase or decrease without departing from the broad aspect of the invention. The curved portions 43 have a bend radius of about 5¼ inches. The central portion 45 is linear and has a length of about 53 inches. The bowed beams 35 and 36 are spaced about 8 inches part and are in aligned registry, so that they are horizontally planar when in the open position 27, and the upper beam 35 is directly above the intermediate beam 36 when in the closed position 25.

The frame 30 has a perimeter or outer frame portion 38 formed by the lower pivot bar 31, side risers 32 and upper beam 35. The perimeter portion 38 of the frame 30 forms a continuous outer loop or box frame construction to provide increased strength. The lower end of each riser 32 is welded to one end of the pivot bar 31. Each vertical riser 32 is normal to the horizontal pivot bar 31. Each outer end portion 42 of the upper bowed beam 35 is welded to the upper end of one of the risers 32 to join them and form the complete box or outer loop construction 38. The intermediate bowed beam 36 forms a lateral cross member that stiffens the box frame portion 38 for added strength. Each outer end portion 42 of the middle bowed beam 36 is welded to a midsection of one of the risers 32. Each outer end 42 of each bowed beam 35 and 36 extends outwardly from and normal to its riser 32 and the pivot bar 31 so that the main middle section 45 of each bowed beam 35 and 36 is parallel to the pivot bar 31.

Figure 3:
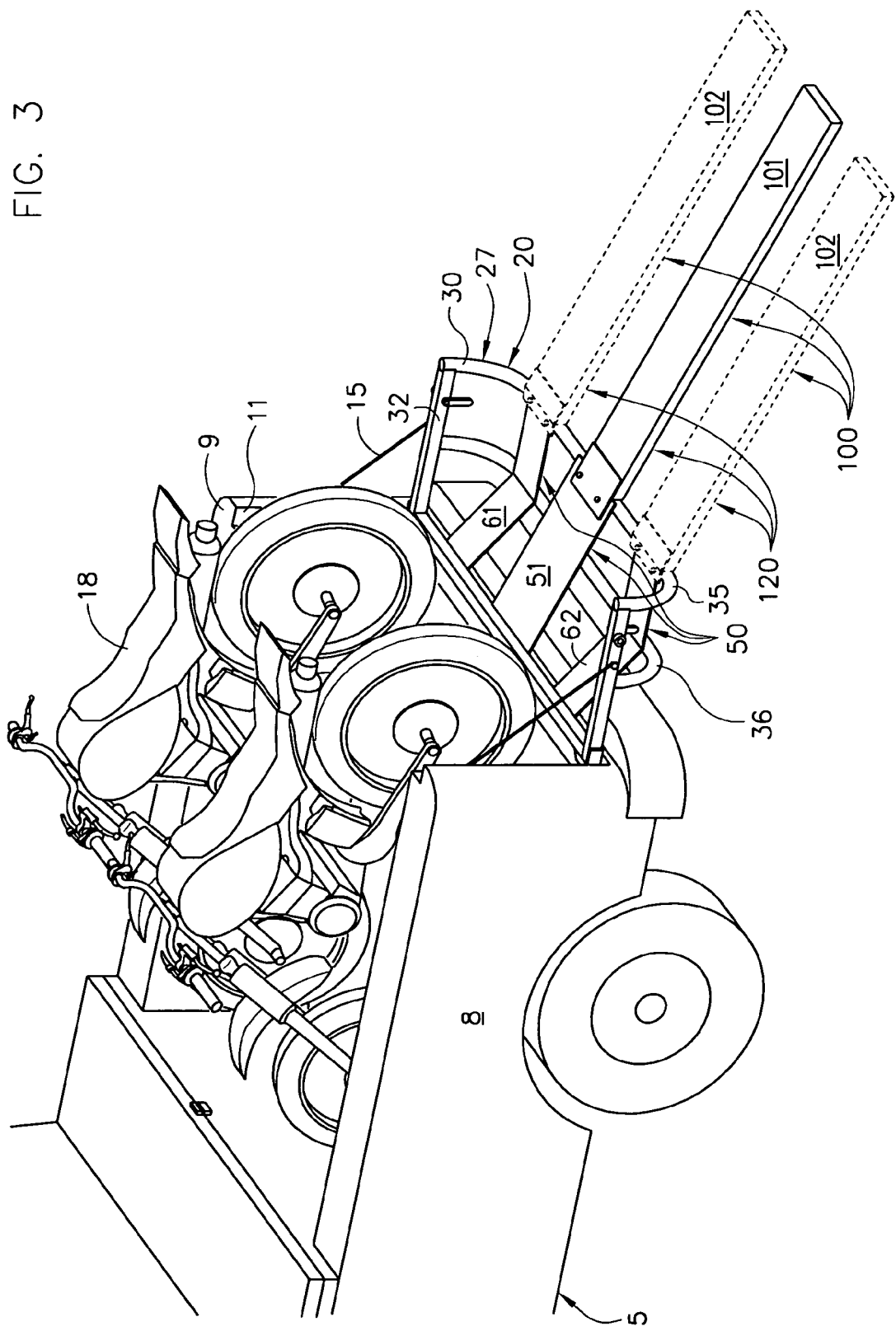
FIG. 3 is a perspective view of the present tailgate invention in its open position with the detachable ramp section secured to the fixed central ramp of the tailgate to form a complete central ramp for a two wheel vehicle, and further showing in phantom detachable ramp sections secured to the fixed side ramps to form two completed side ramps for a four wheel recreational vehicle.
Figure 4:
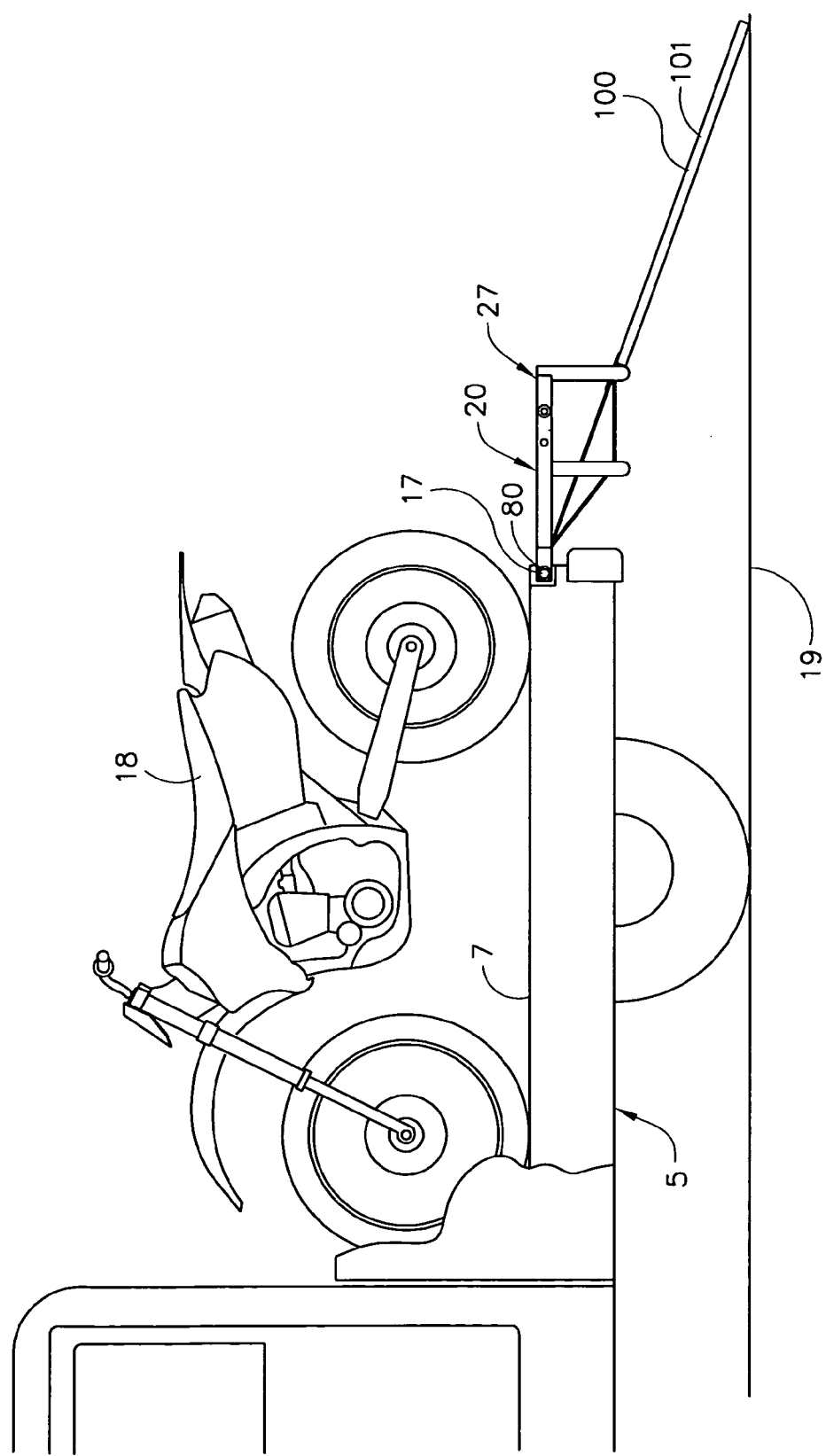
FIG. 4 is a side view of the present tailgate invention in its open position with the detachable ramp section secured to the fixed central ramp to form a complete central ramp for a two wheel vehicle.
Figure 5:
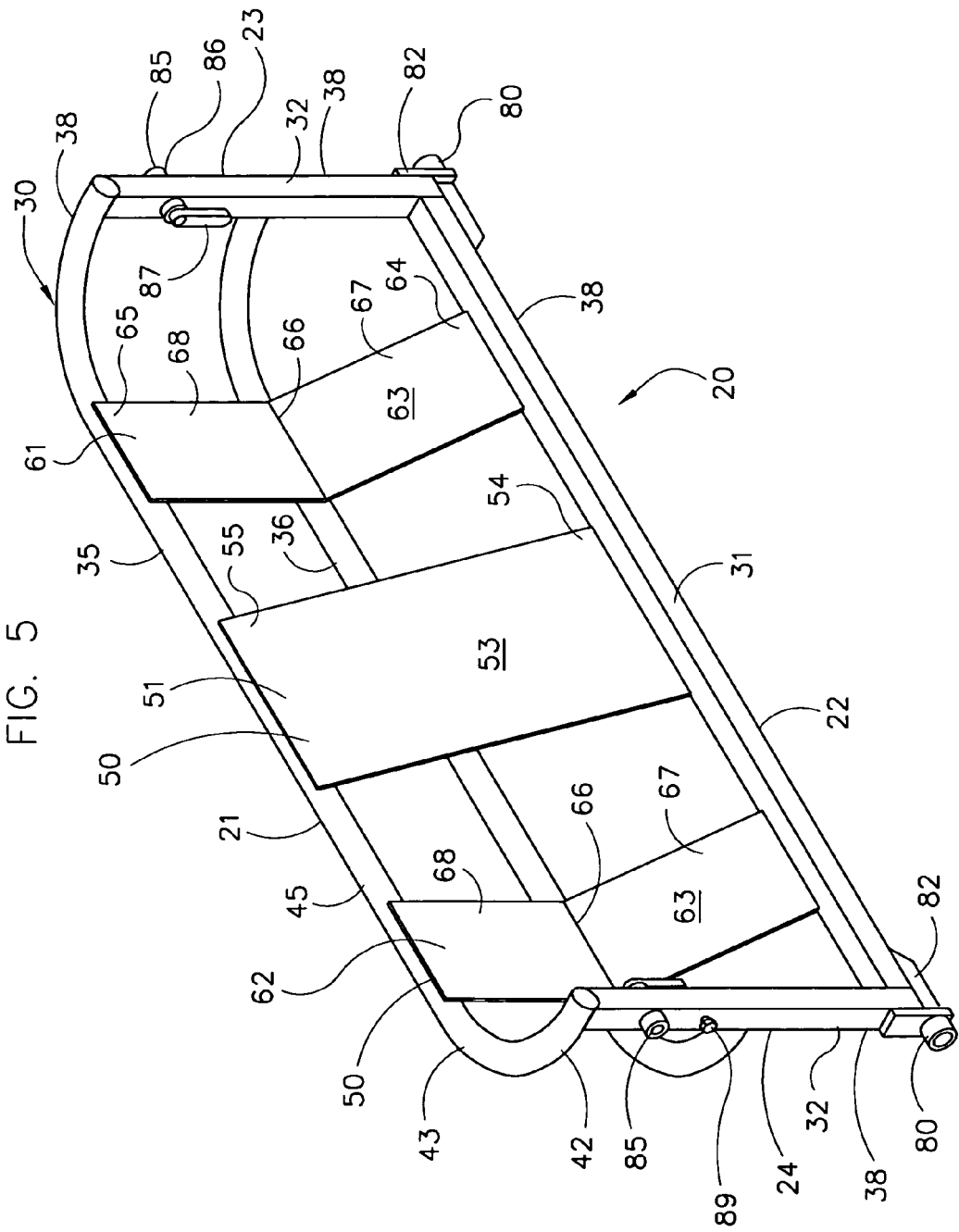
FIG. 5 is a perspective view of the present tailgate invention removed from the pickup truck.
Figure 6:
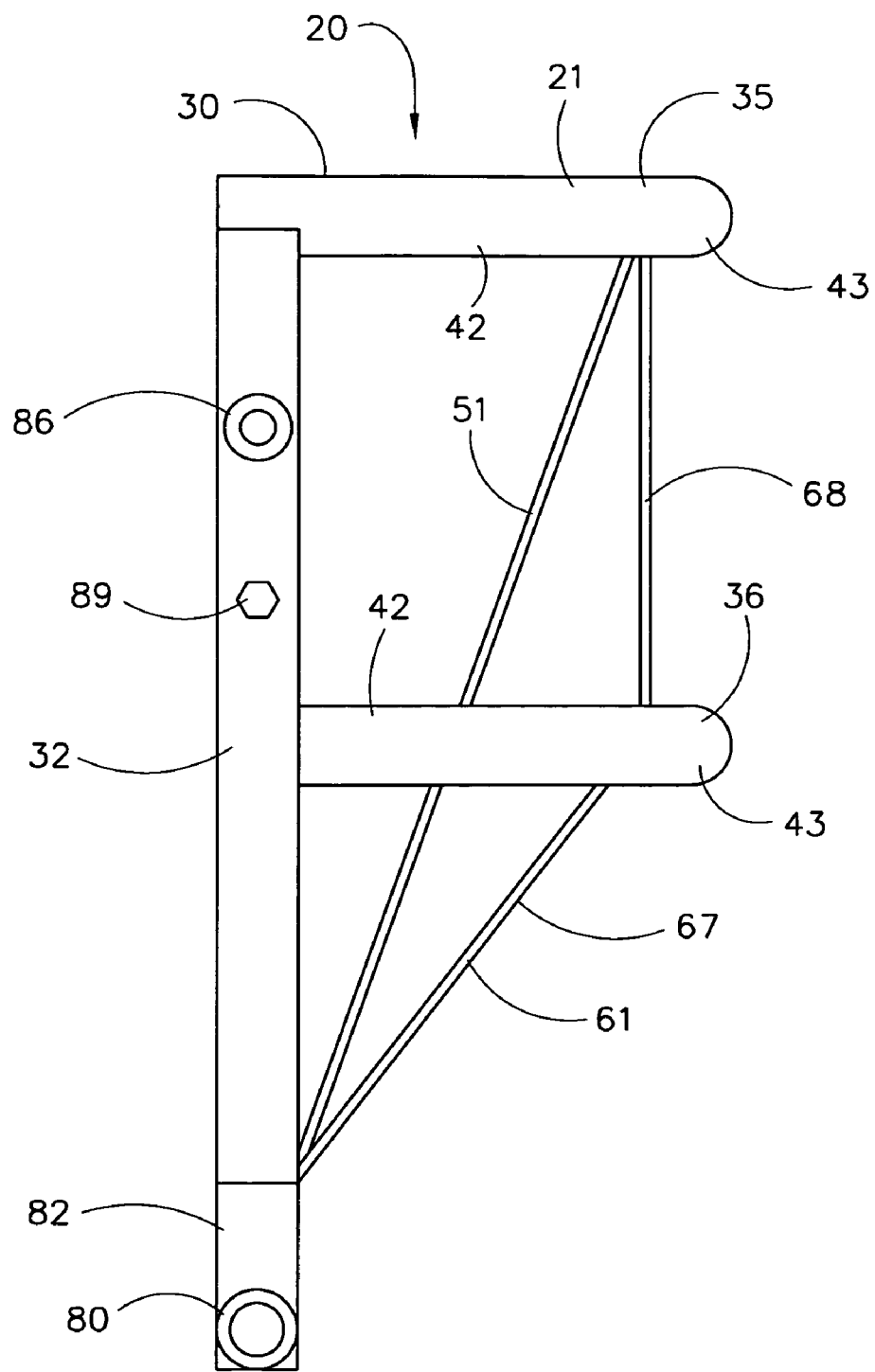
FIG. 6 is a side view of the tailgate invention.

The tailgate 20 includes three fixed ramp sections 50 as best shown in FIGS. 2-4. These ramp sections 50 form longitudinal cross members that increase the strength of the frame 30, and provide ramps to load and unload vehicles 18 into and out of the cargo bay 6. Each ram section 50 extends down toward the ground 19. A central ramp section 51 is located at or near the middle of the tailgate 20. Fixed ramp section 51 is formed by a single steel plate having a length of about 22 inches, a width of about 12 inches, and a uniform thickness of about ⅛ inch. The plate 51 has a flat surface 53, and inner and outer ends 54 and 55. The inner end 54 is welded or otherwise rigidly secured to the pivot bar 31. The outer end 55 is welded or otherwise rigidly secured to the upper bowed beam 35. When the tailgate 20 is open 27 and its risers 32 are generally horizontal and in planar alignment with the truck bed 7, the central ramp section 51 forms a downward sloped incline of about 19°.

Side ramp sections 61 and 62 straddle the central ramp section 51. Each fixed side ramp section 61 or 62 is formed by a single steel plate having a length of about 23 inches, a width of about 7 inches, and a uniform thickness of about ⅛ inch. The plate 51 has a flat surface 63, and inner and outer ends 64 and 65. The inner end 64 is welded or otherwise rigidly secured to the pivot bar 31. The outer end 65 is welded or otherwise rigidly secured to the upper bowed beam 35. Each plate 61 and 62 is bent to form a seam 66 that divides the ramp section into an angled portion 67 and a horizontal or vertical section 68. The seam 66 is located proximal intermediate bowed beam 36, so that each plate 61 and 62 touches and is preferably welded to the intermediate beam 36. When the tailgate 20 is open 27 and its risers 32 are generally horizontal and in planar alignment with the truck bed 7, the angled portion 67 of each ramp section 61 and 62 forms a downward sloped incline of about 45°. The vertical or horizontal section 68 remains planar to the risers 32 during use, and forms a horizontal or intermediate ramp platform or foot step between the truck bed 7 and ground 19 when in the open position 27.

The frame 30 includes two conventional disk shaped mounting cups 80. The cups 80 allow the tailgate 20 to selectively pivot or rotate between its open and closed positions 25 and 27. One cup 80 is located at each opposed corner of the lower end 22 of the frame 30 to form the axis of rotation 17 for the tailgate 20. These circular cups 80 hingably or rotatably secure the tailgate 20 to the pickup truck 5 in a manner similar to the conventional tailgate it is replacing. The cups 80 engage the existing pivotal mounting structure located in the lower ends of the recesses 11 of the pickup truck. Each cup 80 is mounted on an L-shaped bracket 82. Each bracket 82 fits around one of the lower corners of the frame 30. Similar to a conventional tailgate, the brackets 82 offset the pivot bar 31 from the cups 80 and axis of rotation 17. The amount of this offset is about 1 to 2 inches. The ends of the pivot bar 31 and the lower end of each riser 32 have holes for receiving bolt fasteners that secure the brackets 82 to the frame 30. The mounting cups 80 are secured to the brackets 82 by welding.

Additional hardware is secured to the risers 32 for operating the tailgate 20. A latch mechanism 85 is secured to each side 23 and 24 of the frame 30. Each latch 85 includes a stem 86 that rotates in a hole formed completely through its respective riser 32. Each stem 86 is positioned on its riser 32 to align with the pin in the respective recess 11 of the sidewall 9 of the truck 5. The head of each stem 86 is located on the outside of the riser 32, and its shank extends through the riser. The stems 86 are slotted and rotated downward to secure the tailgate 20 in its closed position 25. The shank of each stem 86 is secured to a handle 87 located on the inside of the riser 32. To unlatch the tailgate 20, the handle 87 is rotated upward to disengage the head of the stem 86 from latching engagement with its corresponding pin in recess 11. The latch mechanism 85 preferably includes lock tabs (not shown) to selectively lock and prevent the rotation of the handles 87. The outer surface of the square riser 32 includes metric nut insert 89 and for securing the cord 14. The inserts 89 are located on the risers 32 about fourteen inches from the axis of rotation 17 of the tailgate, which is about the same distance as the lugs 14 in the tailgate recess 11. As a result, the cords 15 extend at about a 45° angle when they are taught and hold the tailgate 20 is in its horizontal or open position 27.

A fold away step 90 is attached to the upper beam 35 of the frame 30. Mounting brackets 92 are bolted to the fixed side ramp sections 61 or 62. The step 90 includes a U-shaped frame 94 with two spaced side members joined by a step member. The end of each side member is pivotally secured to one of the mounting brackets 92. The step 90 is about seven inches wide and has a length of about one foot. Each side member can be bent near its midsection to form a 25° angle. When the tailgate is closed 25 as in FIG. 1, the step 90 is flipped to its folded away position 96. The weight of the step 90 maintains it in this position 96. When the tailgate 20 is opened 27 and when desired, the step 90 is selectively flipped down to its step forming position 95 as in FIG. 2.

The tailgate 20 is used in conjunction with one or more detachable ramp sections 100. During transport, the detachable ramp sections 100 are stored in the cargo bay 6 of the truck 5. During use, the detachable ramp sections 100 are aligned with and placed against the fixed ramp sections 50 to form completed ramps 120 as shown in FIGS. 3 and 4. Each detachable ramp section 100 has its linear length aligned with the length of its corresponding fixed ramp section 50. One end of the detachable ramp section 100 rests on and is preferably removably secured to the outer end of one of the fixed ramp sections 50. The other end of the detachable ramp section 100 rests on the ground 19. Although the detachable ramp sections 100 are part of the overall tailgate 20, it should be understood that these sections 100 can be homemade or purchased separately from the tailgate 20.

The detachable ramp sections 100 form a central detachable ramp 101 for loading and unloading two-wheeled vehicles 18, and two side detachable ramps 102. The central detachable ramp section 101 preferably extends linearly from the fixed ramp section 51 when the truck 5 is on level ground 19 as best shown in FIG. 4. For a truck bed 7 at 36 inches above the ground 19, the central detachable ramp 101 has a length of about 5 feet. The complete ramp 120 formed by the fixed and detachable central ramp sections 51 and 101 has a constant lower incline slope of about 15° or less. The side detachable ramps 102 are preferably the same length as detachable ramp 101 to provide a lower incline slope. This also allows the detachable ramps to be used in an interchangeable manner. Each detachable ramp section 100 can be used as the central detachable ramp 101 or one of the two side detachable ramp sections 102. This interchangeability allows two detachable ramp sections 100 to load and unload both two and four wheeled vehicles 18 on and off the truck 5.

While the invention has been described with reference to a preferred embodiment, it will be understood by those skilled in the art that various changes may be made and equivalents may be substituted without departing from the broader aspects of the invention.

We claim:

1. A tailgate for a pickup truck with a cargo bay formed by its truck bed and opposed sidewalls, said truck bed having a specific length and each of said sidewalls having a rear end, said rear ends of said sidewalls and said truck bed defining a rear tailgate opening for loading and unloading items into and out of said cargo bay, each of said rear ends having an inwardly facing vertical recess adapted to mount and securably receive a conventional generally planar tailgate, said tailgate comprising:
   a unibody frame having a pivot bar, side risers, and a plurality of bowed lateral beams, said frame being selectively rotatable between open and closed positions;
   said pivot bar being generally linear and planar to said truck bed and having opposed ends, each opposed end being pivotally secured in one of the recesses of the sidewalls;
   each of said linear vertical risers extending normally from one of said ends of said pivot bar, said risers being received by said vertical recesses when in said closed position and extending rearwardly when in said open position;
   said plurality of bowed lateral beams including an end beam and an intermediate beam, each bowed lateral beam having arcuate side sections and a linear midsection, each side section extending normally from its said riser and normally to said pivot bar, and said linear midsection being offset from and generally parallel to said pivot bar;
   a fixed central ramp extending linearly between said pivot bar and said linear midsection of said end beam; and,
   wherein said offset midsections of said bowed lateral beams extend the length of the cargo bay when in said closed position, and position said fixed central ramp below said truck bed when in said open position.

2. The tailgate of claim 1, and further including two fixed side ramps, each side ramp extending linearly between said pivot bar and said linear midsection of said intermediate beam, and linearly between said intermediate beam and said end beam.

3. The tailgate of claim 2, and wherein said risers are in a generally horizontal position when said bowed tailgate is in said open position.

4. The tailgate of claim 3, and further comprising a pair of securement lines, each securement line stopping one of said risers at said horizontal position when in said open position.

5. The tailgate of claim 4, and wherein said midsections of said bowed lateral beams are offset about 8 inches rearwardly from said pivot bar to extend said cargo bay about 8 inches when said bowed tailgate is in said closed position.

6. The tailgate of claim 5, and wherein said bowed tailgate has a height of about 24 to 30 inches and said fixed center ramp has an incline angle of about 15° to 20° relative to the truck bed when in said open position.

7. The tailgate of claim 1, and further comprising at least one detachable ramp with opposed ends, one end of said detachable ramp being adapted for supporting engagement with the ground and said other end being adapted for alignment and supporting engagement with one of said fixed ramps proximal said end beam when said tailgate is in said open position to form a continuous ramp from the truck bed to the ground.

8. The tailgate of claim 7, and wherein said detachable ramp has a length of less than the cargo bay.

9. The tailgate of claim 7, and wherein said detachable ramp has a length of about 6 feet, and said ends of said detachable ramp are engaging said fixed ramp and level ground when in substantially linear alignment with said fixed ramp.

10. The tailgate of claim 1, and wherein each of said risers include a latch mechanism to secure said bowed tailgate to said sidewalls when in said closed position.

11. The tailgate of claim 1, and further comprising a foot step joined to said midsection of said end beam and straddling one of said fixed side ramps, said foot step being selectively movable between a downwardly extending position when said bowed tailgate is in its said open positions and a folded position when said bowed tailgate is in said closed position.

12. The tailgate of claim 1, and wherein said pivot bar includes pivot brackets with pivot posts that form a pivot axis, said pivot posts slightly offset said pivot bar from said pivot axis.

* * * * *